T. WHEELER.
COTTON CHOPPER.
APPLICATION FILED JUNE 27, 1912.
1,062,674.
Patented May 27, 1913.
2 SHEETS—SHEET 1.
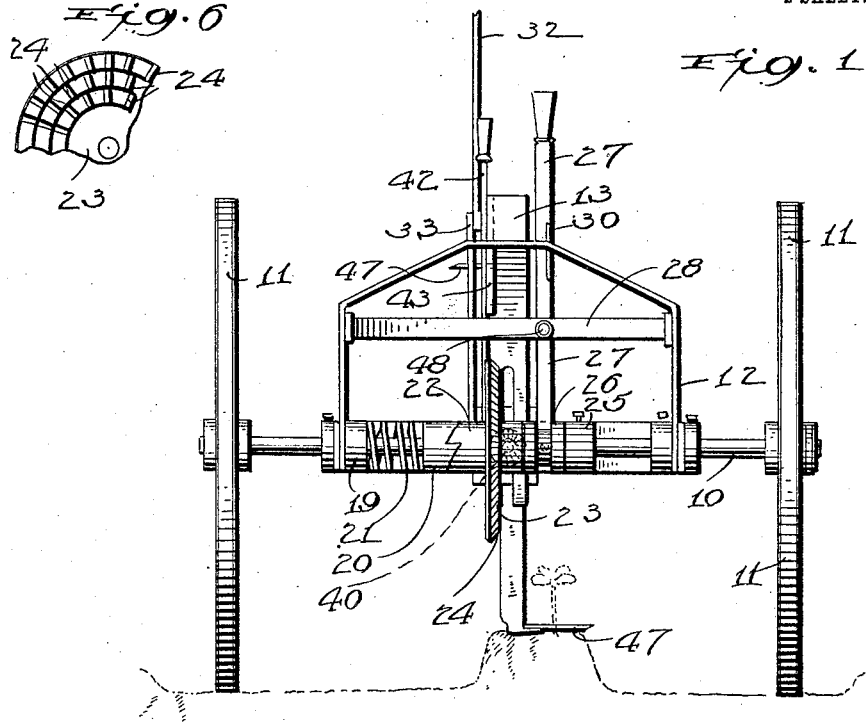
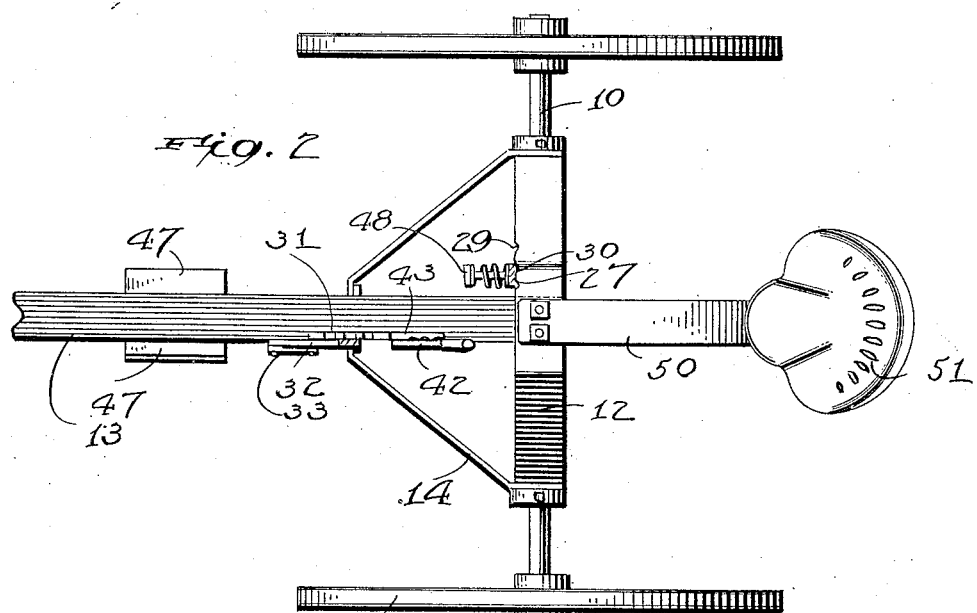
WITNESSES
INVENTOR
Truzy Wheeler
By his Attorney

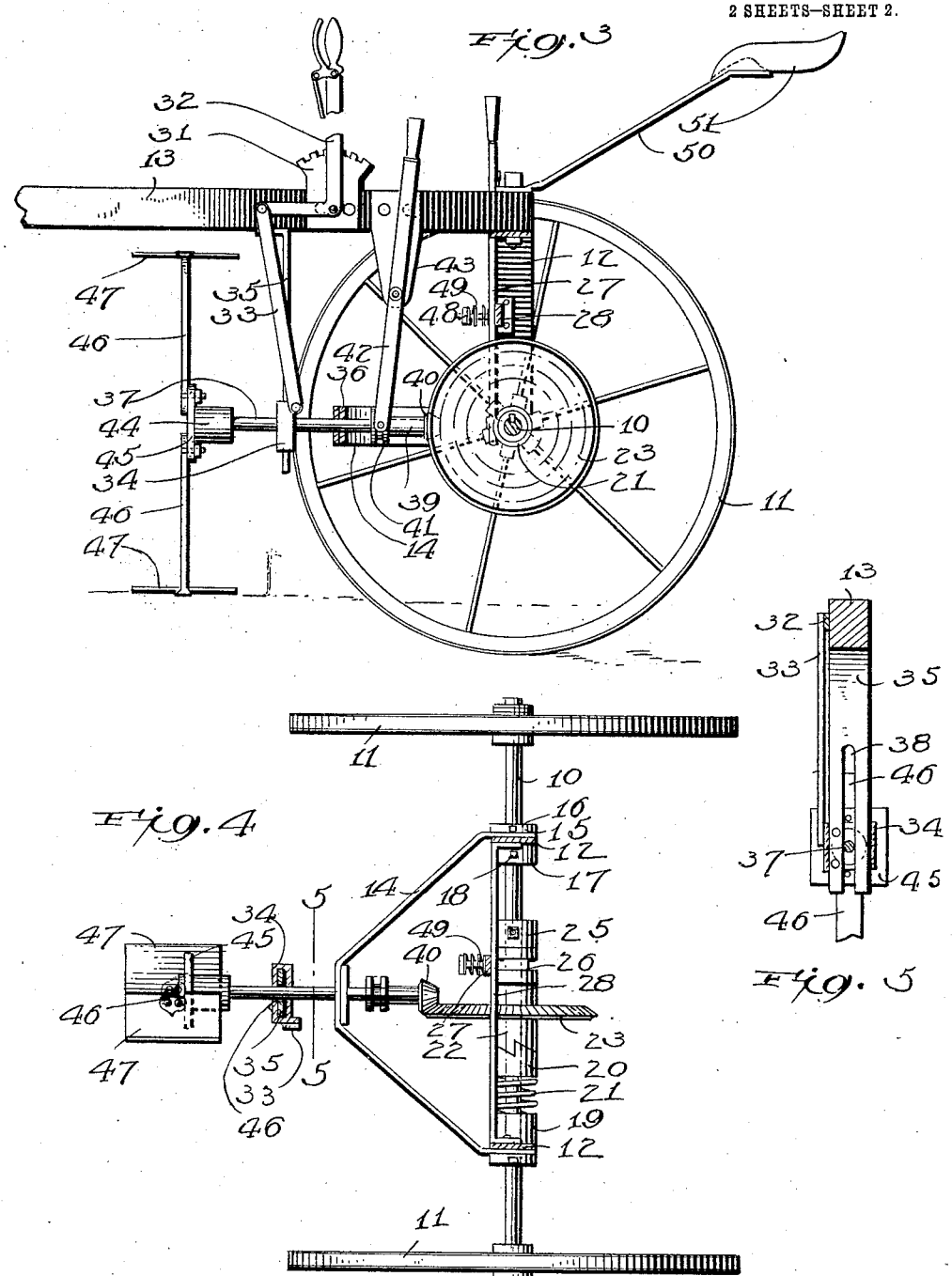

UNITED STATES PATENT OFFICE.

TRUZY WHEELER, OF ALVARADO, TEXAS.

COTTON-CHOPPER.

1,062,674.  Specification of Letters Patent.  Patented May 27, 1913.

Application filed June 27, 1912. Serial No. 706,287.

*To all whom it may concern:*

Be it known that I, TRUZY WHEELER, a citizen of the United States, residing at Alvarado, in the county of Johnson and State of Texas, have invented certain new and useful Improvements in Cotton-Choppers, of which the following is a specification, reference being had therein to the accompanying drawing.

This invention relates to agricultural implements and has special reference to a cotton chopper.

The principal object of the invention is to improve the general construction of devices of this character.

Another object of the invention is to provide an improved driving gear for the chopper blades.

With the above and other objects in view, this invention consists in general of certain novel constructions, combinations and arrangements of parts, as will be hereinafter fully described, illustrated in the accompanying drawings, and specifically claimed.

In the accompanying drawings, like characters of reference indicate like parts in the several views, and Figure 1 is a rear elevation of a cotton chopper the seat and its standard being removed better to disclose the remaining parts. Fig. 2 is a plan view of a chopper. Fig. 3 is a longitudinal section through the chopper. Fig. 4 is a plan view of the chopper with the upper portions removed, the view being partly in section. Fig. 5 is a detail section on the line 5—5, Fig. 4. Fig. 6 is a detail of a portion of a certain gear used in connection with the chopper.

In carrying out the present embodiment of the invention there is provided an axle 10 whereon are mounted ground wheels 11. One of these ground wheels is fixed to the axle while the other revolves freely thereon so that the device may be turned around and driven in a curved line without one wheel slipping and yet the axle be kept constantly turning.

Mounted on the axle 10 is an arch bar or yoke 12 which is provided at its center portion with a tongue 13 to which the draft animals are attached. Outside of the lower ends of the yoke 12 there is mounted a second arch bar or yoke 14 which extends forwardly from the axle 10. Outside of the ends of this last yoke 14 there is provided a pair of collars 15 secured to the axle 10 by a set screw 16. At one end of the axle 10 there is a second collar 17 held on the axle by a set screw 18 and the adjacent ends of the respective members 12 and 14 are held between this collar and one of the collars 15. Resting against the remaining end of the arch bar 12 is a collar 19. Splined upon the axle 10 is a member 20 having ratchet teeth formed on its inner face and this member 20 is held in spaced relation on the collar 19 by means of a coil spring 21 surrounding the axle 10 and bearing at one end against the collar 19 and at the other against the member 20. Loosely mounted on the axle is a hub 22 having the face adjacent the ratchet member 20 provided with co-acting ratchet teeth and on this hub is carried a gear wheel 23 having a series of sets of beveled teeth 24 arranged concentrically thereon. Fixed upon the axle is a collar 25 and between this collar and the hub 22 is a grooved collar 26 wherein fits the fork of a shipper lever 27 pivoted intermediate its ends to a brace bar 28 which extends between the arms of the arch bar 12. This arch bar is provided with a series of notches 29 to receive the edge of a lip 30 formed on the lever 27.

Secured to the tongue 13 is a quadrant 31 whereon is mounted a bell crank latch lever 32 which is connected by means of a link 33 with a cuff 34 having a bearing opening therein. This cuff 34 slides on a bar 35 depending from the tongue 13. The yoke member 14 has a plate 36 secured centrally thereof and through this plate and the yoke member there is provided a second bearing opening. In these two bearing openings is mounted a shaft 37 and it is to be noted that the member 35 has sufficient flexibility so that when the latch lever 32 is moved to raise or lower the cuff and consequently the outer end of the shaft, the bar 35 will move slightly to accommodate the change in angularity. Furthermore, this bar 35 is provided with a slot 38 through which the shaft passes.

Fixed upon the shaft 37 is a sleeve 39 which carries at one end a beveled gear 40 and at the other end a grooved collar 41 wherein fits the yoke end of a shipper lever 42 pivoted intermediate its ends to a plate 43 depending from the tongue 13. On the outer end of the shaft 37 is fixed a hub 44 having a flange 45 formed thereon and to this flange are secured arms 36 each bearing a chopping hoe 47.

In order to permit the lip 30 being sprung out of its engaging notch the pivot pin of the lever 27 is relatively long and is provided with a nut in spaced relation to the lever. Between this nut and the lever there is provided a spring 48 which normally holds the lever in such position that the lip engages a notch.

It is to be noted that the teeth on the respective gears 23 and 40 are somewhat loose in mesh so that variation in angularity with the change in the diameter obtained by meshing with the various series 24 will be permitted.

In the operation of the device when it is desired to shift from one row of teeth 24 to another, the lever 27 is manipulated to compress the spring 21 and force the gear 23 to the left of Fig. 1. Then the lever 42 is moved to bring the gear 40 into position for mesh with the desired row of teeth 24. Thereupon the lever 27 is again moved to permit such meshing.

It is to be noted that by reason of the peculiar yoke and arch bar construction the thrust of the spring under compression is taken up not only by a single collar but also by the collar 17 at the opposite end, the arch bar and yoke thus aiding in strengthening the device.

When it is desired to raise or lower the chopper blades it will be obvious that the lever 32 is used.

The device is provided with the usual standard 50 and driver's seat 51 and the driver having taken position thereon the machine is driven to the field. When the gears have been properly adjusted the machine is driven so that the growing plants pass between the wheels, whereupon the rotation of the chopper blades will remove the plants at intervals, thus allowing room for the growing plants and thinning the crop.

There has thus been provided a simple and efficient device of the kind described, and for the purpose specified.

It is obvious that many minor changes may be made in the form and construction of this invention without departing from the material principles thereof, and it is therefore not wished to confine the invention to the exact form herein shown and described, but it is wished to include all such as properly come within the scope claimed.

Having thus described the invention, what is claimed as new, is:—

In a device of the kind described, an axle, a pair of wheels supporting said axle, one of said wheels being fixed thereon, spaced collars on said axle, a yoke having its ends pivotally mounted on said axle and bearing against said collars, an arch bar having its end mounted on said axle and bearing against the equal faces of the yoke ends, a tongue extending forward from said arch bar, a collar on said axle bearing against one of the ends of the arch bar, a ratchet member splined to said axle, a spring bearing at one end against the last mentioned collar and at the other end against said ratchet member, a hub provided with ratchet teeth coacting with the teeth on the ratchet member, a gear carried by said hub and provided with concentric series of beveled teeth, a grooved collar slidably mounted on said axle and bearing against said hub, a cross bar connecting the arms of the arch bar, a shipper lever pivoted thereto and engaging the grooved collar, a bar depending from said tongue and having its lower end slotted, a cuff slidably mounted on said bar, a shaft journaled in said cuff, a yoke mounted on said axle, a gear fixed on said shaft, means to move said shaft longitudinally, means to raise and lower said cuff, and chopper blades carried by said shaft.

In testimony whereof I hereunto affix my signature in presence of two witnesses.

TRUZY WHEELER.

Witnesses:
P. K. THOMPSON,
A. B. MAHANEY.

---

Copies of this patent may be obtained for five cents each, by addressing the "Commissioner of Patents, Washington, D. C."